J. E. REDFORD.
AUTOMATIC SLACK ADJUSTER.
APPLICATION FILED MAR. 13, 1919.
1,370,840.
Patented Mar. 8, 1921.
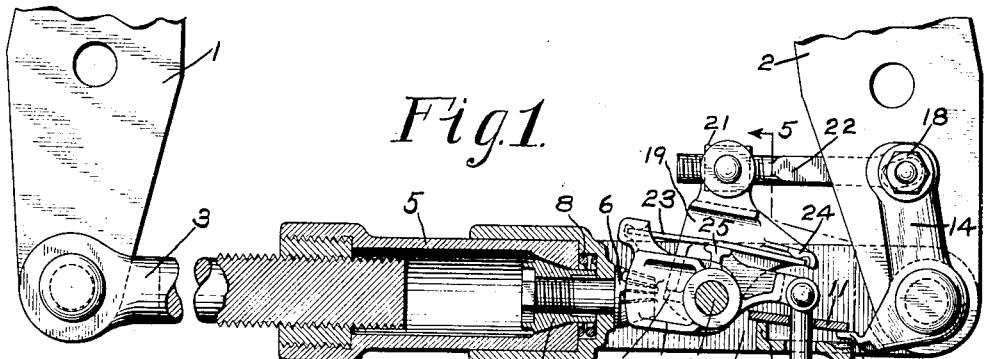
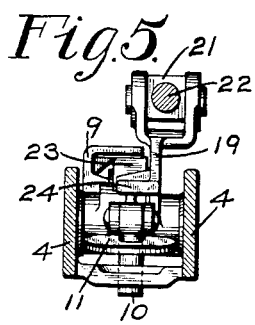
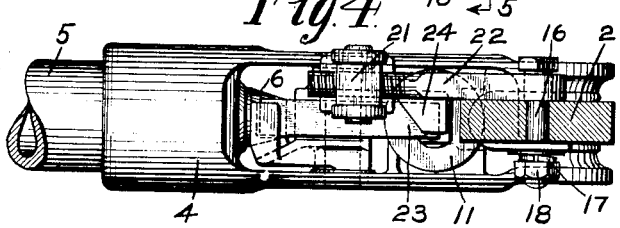
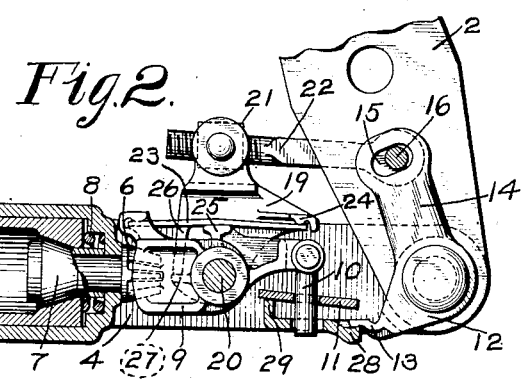
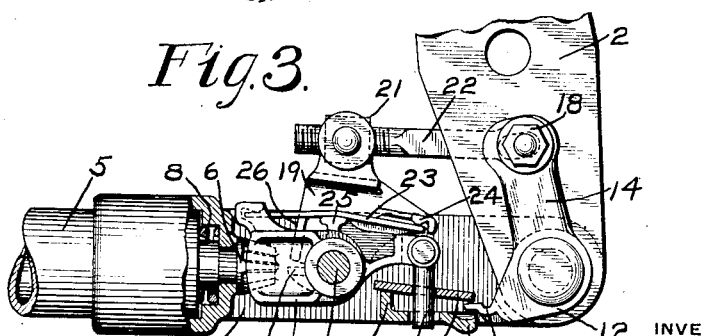
INVENTOR
John E. Redford
by Wm. M. Cady
Att'y.

UNITED STATES PATENT OFFICE.

JOHN E. REDFORD, OF KINLOCH, MISSOURI, ASSIGNOR TO AMERICAN BRAKE COMPANY, OF ST. LOUIS, MISSOURI, A CORPORATION OF MISSOURI.

AUTOMATIC SLACK-ADJUSTER.

1,370,840.      Specification of Letters Patent.      Patented Mar. 8, 1921.

Application filed March 13, 1919. Serial No. 282,364.

*To all whom it may concern:*

Be it known that I, JOHN E. REDFORD, a citizen of the United States, residing at Kinloch, in the county of St. Louis and State of Missouri, have invented new and useful Improvements in Automatic Slack-Adjusters, of which the following is a specification.

This invention relates to railway brake slack adjusters of the type in which the bottom rod connecting the brake levers is provided with means for automatically taking up the slack due to the wear of the brake shoes on the wheels.

The principal object of my invention is to provide an improved brake slack adjuster of the above character.

In the accompanying drawing, Figure 1 is a side elevation, partly in section, of a slack adjuster embodying my invention, and showing the parts in the positions assumed when the brake levers are in applied position and there is an excess movement of the brake levers; Fig. 2 a fragmentary view of the construction shown in Fig. 1, showing the parts in the positions assumed when the brake levers are in release position; Fig. 3 a view similar to Fig. 2, but showing the parts in the positions assumed when the brake levers are in applied position and there is no excess movement of the brake levers; Fig. 4 a plan view of the slack adjusting mechanism shown in Fig. 1; and Fig. 5 a section on the line 5—5 of Fig. 1.

According to my invention, an automatically adjustable member is employed in place of the bottom rod which ordinarily connects the usual brake levers 1 and 2.

This adjustable member preferably comprises a screw threaded stub rod 3 pivotally connected to the brake lever 1, a fork shaped stub rod 4, pivotally connected to brake lever 2 and having a socket at one end, and a nut 5, fitting within the socket of the rod 4, and having screw threaded engagement with the rod 3.

Mounted in a bearing in the rod 4 is a bevel pinion 6, having a friction cone 7 at one end adapted to frictionally engage a corresponding friction face provided in the nut 5, a spring 8, interposed between the rod 4 and the nut 5, tending to yieldingly maintain frictional engagement of the cone with the nut.

For operating the pinion 6, a gear segment 9 is provided, having teeth meshing with the pinion and pivotally mounted in the space formed by the fork members of the rod 4.

For preventing movement of the gear segment 9, under certain conditions, a locking device is provided, comprising a plunger 10, pivoted to the segment, and a tilting washer 11, having one side adapted to bear on a stop 29 carried by the rod 4, so as to tilt the washer and thus cause the same to grip the plunger 10 and thereby lock the segment 9 against rotative movement.

In order to release the washer 11 from its gripping engagement with the plunger 10, a member 12 is provided, which is pivotally mounted on the brake lever 2 and has a finger 13, adapted to engage the washer 11. For determining the angular relation of the finger 13 with respect to the brake lever 2, the member 12 is provided with an arm 14, having an elongated slot 15 at the outer end, within which is a pin 16, carried by the lever 2.

The movement of the arm 14, relative to the pin 16 is frictionally resisted by the pressure of a split spring washer 17, which is pressed against the arm by a nut 18.

For operating the gear segment 9, a rocker arm 19 is provided, which is pivotally mounted on the pin 20 which carries the segment 9.

The outer end of the arm 19 is forked and incloses a trunnion nut 21 having screw threaded engagement with a rod 22 which is pivotally mounted on the pin 16, carried by brake lever 2.

A flat spring 23 has one end secured to the segment 9 and the opposite end adapted to be engaged by a finger 24 carried by the arm 19, and at an intermediate point a rib 25 of the segment 9 engages the spring.

The arm 19 effects the movement of segment 9 through the engagement of a rib section 26 thereof with a lug 27, carried by said segment.

In operation, with the parts assembled, and the nut 21 adjusted on the rod 22, so that in release position, the arm 19 is positioned as shown in Fig. 2, when the brakes are applied, the brake levers 1 and 2 move apart and the bottom rod member being under compression, the rod 4 is pressed against the nut 5, compressing the spring 8 and causing the friction cone 7 to move out of frictional engagement with the nut 5.

The movement of lever 2 causes the rod 22 to rock the arm 19 so that the spring 23 is flexed, as shown in Fig. 3. The segment 9, during this movement is prevented from rotating by reason of the locking of the washer 11 on the plunger 10.

If the movement of the brake lever 2 does not exceed the normal, then the finger 13 will not move far enough to engage the washer 11, when the brake shoes are fully applied to the wheels and the parts will remain in the positions shown in Fig. 3.

If, however, there is an excess movement of the brake lever 2, in applying the brakes, the finger 13 will engage and trip the washer 11, thus releasing the plunger 10, so as to permit the energy stored up in the spring 23, by the rotation of arm 19, to effect a rotative movement of the segment, until the lug 27 is brought into engagement with the rib section 26.

As hereinbefore mentioned, the friction cone 7 does not frictionally engage the nut 5 in applying the brakes, so that the segment 9 merely rotates the pinion 6 in the above described movement, without turning the nut 5.

Upon releasing the brakes, the inward movement of the brake lever 2 causes the rod 22 to rock the arm 19, so as to turn the segment 9 through the engagement of rib 26 with lug 27 and thus effect the rotation of pinion 6.

In releasing, the bottom rod member is under tension, so that the rod member 4 tends to separate from the nut 5 as assisted by the spring 8 and as a consequence, the friction cone 7 frictionally engages the nut 5 and causes the rotation of the pinion 6 to rotate the nut 5, so that the bottom rod member is lengthened, by the turning of the nut 5 on the stub rod 3, to compensate for the slack.

The member 12 is adapted to adjust itself to the new angular relation set up when slack is taken up by the action of the finger 13 engaging a stop 28 carried by the rod 4. In the movement of the parts to release position, after slack has been taken up, the finger 13 will engage the stop 28, before the full release position is reached, and then the further movement of the parts causes the member 12 to rotate on its pivot against the frictional resistance of the spring washer 17.

The play of the finger 13 between the stop 28 and the washer 11 is such as to allow for a certain amount of clearance between the brake shoes and the wheels when the parts are in release position, as otherwise, the device would operate to take up all the slack and thus cause the brake shoes to engage the wheels, even in release position.

Having now described my invention, what I claim as new, and desire to secure by Letters Patent, is:—

1. In an automatic slack adjuster, the combination with a brake lever, of a slack take-up mechanism including an operating member, means acting on said member, mechanism operated by said brake lever for storing energy in said means during the normal movement of said lever, a device for normally locking said member against movement, and means operated upon excess movement of the brake lever for releasing said locking device.

2. In an automatic slack adjuster, the combination with a brake lever, of a slack take-up mechanism including an operating member, a spring, the flexing of which tends to move said member, mechanism operated by said brake lever for flexing said spring during the normal movement of the brake lever, a device for normally locking said member against movement, and means operated upon excess movement of the brake lever for tripping said locking device.

3. In an automatic slack adjuster, the combination with a brake lever, of a slack take-up mechanism including an operating member, a locking device for preventing movement of said member and having a locking member, and a finger normally movable with the brake lever relatively to said locking member and adapted to engage and trip said member upon excess movement of the brake lever.

4. In an automatic slack adjuster, the combination with a brake lever, of a mechanism, the rotation of which is adapted to take up slack, a pinion for rotating said mechanism, a clutch device for operatively connecting said pinion with said mechanism, and a gear segment meshing with said pinion and operated by said brake lever.

In testimony whereof I have hereunto set my hand.

JOHN E. REDFORD.